United States Patent Office 3,347,833
Patented Oct. 17, 1967

3,347,833
EPOXY ORGANO-TIN COMPOUNDS
George Smith, Richmond, Calif., assignor to Shell Oil Company, New York, N.Y., a corporation of Delaware
No Drawing. Filed Dec. 8, 1964, Ser. No. 416,881
7 Claims. (Cl. 260—78.4)

ABSTRACT OF THE DISCLOSURE

Per($\beta$-carboglycidoxyethyl)mono- to di-tin, useful as a precursor of epoxy resins, and the insoluble, infusible material obtained by heating the tin compound with an epoxy curing agent.

---

This invention relates to organo-tin compounds possessing a multiplicity of epoxide moieties, and to cured products prepared therefrom.

It is often advantageous to incorporate relatively large proportions of metal-containing compounds into epoxide resins. In general, the presence of substantial quantities of metal compound increases the weight of the resin and often contributes to a more metallic appearance which is highly desirable in certain applications. Conventional methods of introducing metal compounds into epoxy resins generally comprise the addition of metal salts as catalytic curing agents and/or promoters. However, because of the somewhat heterogeneous character of the metal compound-containing resins prepared in this manner, the physical strength of the resin product is generally decreased when substantial quantities of metal compound are added. It would be of advantage to provide organo-metallic compounds possessing epoxide groups, from which resins are prepared containing chemically bound metal moieties and containing a comparably high percentage of metal.

It is the object of this invention to provide novel organo-tin compounds which possess epoxide moieties, and the novel cured products produced therefrom. An additional object is to provide epoxide-containing organo-tin compounds having a high functionality with regard to the epoxide linkages present, that is, a multiplicity of epoxide linkages per molecule. A further object is to provide novel cured epoxy resin products containing tin which is chemically bonded within the polymer chain.

It has now been found that these objects are accomplished by the provision of tin compound containing from 1 to 2 tin atoms wherein each free valence of the tin atom(s) is satisfied by bonding to an ethyl substituent, the beta carbon atom of which is further substituted with a carboglycidoxy substituent, and resins prepared therefrom.

The monomeric epoxy organo-tin compounds of the invention are tetrakis($\beta$-carboglycidoxyethyl)tin and hexakis($\beta$-carboglycidoxyethyl)ditin, which compounds are generically represented as per($\beta$-carboglycidoxyethyl) mono- to di-tin wherein the terminology "per" has the conventional meaning in that all available valences of the mono- to di-tin compounds are satisfied by bonding to a $\beta$-carboglycidoxyethyl moiety. Such compounds are further illustrated by the formula

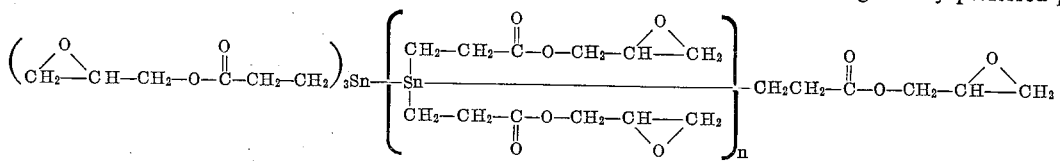

wherein $n$ is a whole number from 0 to 1 inclusive.

The $\beta$-carboglycidoxyethyl tin compounds of the invention are customarily prepared by reaction of the corresponding $\beta$-carboxyethyl tin compounds, or alternatively a salt thereof, with an epihalohydrin, preferably epichlorohydrin. The carboxylic acid derivatives are conveniently produced from corresponding per($\beta$-cyanoethyl)mono- to di-tin compounds. In co-pending U.S. application of Smith, Ser. No. 407,243, filed Oct. 28, 1964, the production of such $\beta$-cyanoethyl and $\beta$-carboxyethyl tin compounds is described in detail and is claimed. Broadly speaking, per($\beta$-cyanoethyl)mono- to di-tin compounds are produced by electrolysis of aqueous solutions of acrylonitrile in the presence of a tin cathode and an inert anode under conditions of a controlled cathode potential. In general, aqueous electrolyte solutions containing from about 3% by weight to about 30% by weight of acrylonitrile are satisfactorily employed and the electrolysis is conducted at temperatures from about 0° C. to about 40° C., with the higher acrylonitrile concentrations and higher reaction temperatures favoring the production of tetrakis ($\beta$-cyanoethyl)tin and the lower concentrations and reaction temperatures favoring the production of hexakis($\beta$-cyanoethyl)ditin.

The success of the electrolysis procedure is based to a considerable extent on utilization of an electrolyte solution having a pH above 7, but below about 9.5, and conducting the electrolysis at a controlled cathode potential, e.g., from about —1.6 volt to about —2.0 volts vs. the Saturated Calomel Electrode. From the per($\beta$-cyanoethyl)mono- to di-tin compounds are produced by processes of basic hydrolysis, e.g., hydrolysis of the $\beta$-cyanoethyl tin compounds in the presence of alkali metal base, metal salts, e.g., alkali metal salts, of the per($\beta$-carboxyethyl) mono- to di-tin compounds. These salts are acidified to produce the corresponding per($\beta$-carboxyethyl)mono- to di-tin derivatives, or alternatively the $\beta$-carboxyethyl tin compounds are produced from the cyanoethyl derivatives by acid hydrolysis.

The $\beta$-carboxyethyl tin compounds, or alternatively the salts thereof, particularly the alkali metal salts, are reacted with an epihalohydrin to produce the novel $\beta$-carboglycidoxyethyl compounds of the invention. Although other epihalohydrins such as epibromohydrin and epiiodohydrin are operable, best results are obtained when epichlorohydrin is employed as the reactant and the use of epichlorohydrin in the production of the novel compounds of the invention is preferred.

The preparation of the $\beta$-carboglycidoxyethyl tin compounds is effected by methods that are chiefly conventional. In one modification, the $\beta$-carboxyethyl tin reactant is admixed with an excess, e.g., a ten-fold excess, of epichlorohydrin, and an alkali metal base, particularly an alkali metal hydroxide such as potassium hydroxide, is added thereto. The reaction mixture is maintained at an elevated temperature and the water formed during reaction is removed by distillation. It is frequently advantageous to employ a catalyst in this modification and best results are obtained when a tetraalkyl ammonium halide, for example, tetramethylammonium bromide, is utilized. This type of glycidyl ester production is exemplified by the process of June et al., U.S. 3,075,999, issued Jan. 29, 1963.

In an alternate but generally preferred preparation of the $\beta$-carboglycidoxyethyl tin compounds of the invention, a metal salt, preferably an alkali metal salt, of the desired $\beta$-carboxyethyl tin reactant is prepared, as by neutralization of the corresponding carboxylic acid with alkali metal hydroxide or by alkaline hydrolysis of the appropriate β-cyanoethyl tin compound, and is heated with an excess of epihalohydrin, also preferably in the presence of a quaternary ammonium salt as catalyst. Subsequent to reaction, the more volatile product mixture components may be removed as by fractional distillation, whereupon the glycidyl ester product is recovered and purified by conventional methods. This process type is illustrated by the disclosure of U.S. 2,537,981, issued Jan. 16, 1951, to Edwards.

As previously stated, the epoxy organo-tin compounds of the invention are materials from which useful tin-containing epoxide resins are prepared. The epoxides of the invention have the structural advantage of offering a closely knit, polyfunctional character that imparts to the resins prepared therefrom qualities of strength and resistance to the detrimental effects of heat. Through the use of a variety of epoxy curing agents, the epoxy compounds of the invention are polymerized but alternatively they may be mixed with other epoxy compounds such as other glycidyl esters, glycidyl ethers, epoxy alcohols and the like and then cured, thereby producing copolymeric resins. The epoxy organo-tin compounds may additionally be homopolymerized.

Preferred epoxy curing agents are those having active hydrogen atoms, as illustrated by the amines including trimethylenediamine, diethylenetriamine, diethylamine and p-phenylenediamine; polyamides including the Versamides which are reaction products of polyamines and polymerized fatty acids; and polycarboxylic acids including oxalic acid, phthalic acid and tetrahydrophthalic acid. Other suitable curing agents include tertiary amines such as triethylamine, trimethylamine and benzyldimethylamine; polycarboxylic acid anhydrides such as dodecenylsuccinic anhydride, methylnadic anhydride, phthalic anhydride and hexahydrophthalic anhydride; and metal salts as illustrated by the copper, zinc, and potassium salts of fluoboric, sulfuric and phosphoric acids. In addition, the polysulfide resins, Lewis acids such as aluminum chloride and stannic chloride, and metallic hydroxides, e.g., sodium hyroxide and potassium hydroxide, are also satisfactory curing agents.

The amount of curing agent required for curing the epoxy organo-tin compounds will vary over a considerable range, depending upon the agent selected. With curing agents having active hydrogen atoms, suitable amounts will vary up to and including stoichiometric amounts, that is, one mole of active hydrogen atom for each mole of epoxy group to be reacted. The other curing agents are typically empolyed in amounts ranging from about 1% to about 20% by weight.

The epoxy organo-tin compounds are cured by mixing with the curing agent. Although the cure will take place at room temperature, the cure is accelerated by the application of heat, such as by effecting the cure at temperatures from about 50° C. to about 200° C. The cured products thus obtained are typically hard, infusible materials when highly cross-linked, or are somewhat elastomeric in character when complete cross-linking has not taken place. The resins are further characterized by lack of solubility in common organic solvents such as ketones, alcohols, hydrocrabons and the like. The resin products are useful in adhesives, laminates, castings and coatings.

To further illustrate the novel epoxy organo-tin compounds of the invention, and the polymeric products prepared therefrom, the following examples are provided. It should be understood that the details thereof are not to be regarded as limitations as they may be varied as will be understood by one skilled in this art.

*Example I*

To 10.02 g. (0.3 mole) of tetrakis(β-cyanoethyl)tin was added a solution of 4.8 g. (0.12 mole) of sodium hydroxide in 25 ml. of 50% by weight aqueous methanol. The suspension was refluxed for 67 hours by which time the evolution of ammonia had ceased. The clear light yellow solution was evaporated to dryness to yield 15.2 g. of the tetra sodium salt of tetrakis(β-carboxyethyl)tin, a hygroscopic light cream solid which did not melt below 300° C. The infrared spectrum of the product showed no nitrile absorption at 2240 cm.$^{-1}$. The elemental analysis was as follows:

|  | Anal. Calc. | Found |
| --- | --- | --- |
| C, percent wt | 28.9 | 28.5 |
| H, percent wt | 3.2 | 3.5 |
| Sn, percent wt | 23.7 | 21.9 |
| Na, percent wt | 18.5 | 18.5 |

By similar procedure employing potassium hydroxide, the tetra potassium salt of tetrakis(β-carboxyethyl)tin was prepared, also a light cream hygroscopic solid.

*Example II*

In 10 ml. of water, 4 g. of the sodium salt prepared in Example I was acidified with 30 ml. of 15% aqueous hydrochrloric acid. The white solid precipitate obtained on cooling was filtered and was rapidly crystallized from boiling water to give a first crop of white crystals of tetrakis(β-carboxyethyl)tin, M.P. 112–113° C. The elemental analysis was as follows:

|  | Anal. Calc. | Found |
| --- | --- | --- |
| C, percent wt | 35.2 | 34.9 |
| H, percent wt | 4.8 | 4.8 |

*Example III*

To 13.4 g. (0.0238 mole) of the tetra potassium salt of tetrakis(β-carboxyethyl)tin suspended in 92.5 g. (1.0 mole) of epichlorohydrin was added 0.5 g. (0.032 mole) of tetramethylammonium bromide and the stirred suspension was placed in an oil bath maintained at 130–135° C. The refluxing mixture was stirred for 1 hour at which time the excess epichlorohydrin was flashed off to leave a light yellow mobile oil. The oil was dissolved in methylene chloride, and subsequent to filtration, the solution was washed with water, 5% aqueous sodium bicarbonate and again with water. The solution was then dried and the solvent removed by evaporation to yield 12.7 g. of a light yellow oil. The presence of tetrakis(β-carboglycidoxyethyl)tin in the product was indicated by the infrared spectrum which contained characteristic ester and epoxide bands along with a small hydroxyl band, and by the following analysis for tin and epoxide content.

|  | Anal. Calc. | Found |
| --- | --- | --- |
| Epoxide value, eq./100 g | 0.627 | 0.459 |
| Sn, percent wt | 18.6 | 15.7 |

When the above procedure was repeated employing 9.96 g. (0.02 mole) of the sodium salt of tetrakis(β-carboxyethyl)tin, 88.9 g. (0.96 mole) of epichlorohydrin and 0.78 g. (0.005 mole) of tetramethylammonium bromide, the tetrakis(β-carboglycidoxyethyl)tin product contained 56.4% of the theoretical epoxide value and 79.5% of the theoretical tin content.

*Example IV*

By a procedure similar to that of Example III, part 1, 9.03 g. (0.01 mole) of the hexa potassium salt of hexakis(β-caboxyethyl)ditin was reacted with 66.7 g. (0.72 mole) of epichlorohydrin in the presence of 1.56 g. (0.01 mole) of tetramethylammonium bromide. The product mixture containing hexakis(β-carboglycidoxyethyl)ditin was obtained as a light yellow gum having the following analysis:

|  | Anal. Calc. | Found |
|---|---|---|
| Epoxide value, eq./100 g | 0.59 | 0.385 |
| Sn, percent wt | 23.4 | 19.1 |

Similar results were obtained when the corresponding sodium salt of hexakis(β-carboxyethyl)dithin was employed. From the reaction of 7 g. (0.00865 mole) of this sodium salt, and 48 g. (0.348 mole) of epichlorohydrin in the presence of 0.5 g. (0.0033 mole) of tetramethylammonium bromide was obtained 8.3 g. of a light yellow gum containing hexakis(β - carboglycidoxyethyl)ditin which had 52.2% of theoretical epoxide value and 67.0% of the theoretical tin content.

*Example V*

With 2.55 g. of the tetrakis(β-carboglycidoxyethyl)tin prepared in Example III, part 1 (which represented 0.004 mole based on glycidyl ester), was mixed 1.805 g. (0.0116 mole) of hexahydrophthalic anhydride and 0.02 g. of benzyldimethylamine as catalyst. The viscous mixture was placed in a mold and cured in an oven at 80° C. for 3 hours and at 120° C. for 5.5 hours. The product was a hard, infusible yellow solid which was insoluble in common organic solvents such as acetone, methyl ethyl ketone, benzene, toluene, methanol and chloroform.

When a curing process similar to that above was utilized except that the cure was effected at 85–95° C. during 6.5 hours, the product was a light yellow, infusible elastomeric material which was also insoluble in common organic solvents.

*Example VI*

To 2.04 g. (0.002 mole based on glycidyl ester) of the hexakis(β-carboglycidoxyethyl)ditin product of Example IV, part 1, was added 1.22 g. (0.00784 mole) of hexahydrophthalic anhydride and 0.01 g. of benzyldimethylamine. The mixture was cured for 3 hours at 80° C. and for 4 hours at 120° C. The resulting product was a clear yellow, hard, infusible solid which was not soluble in common organic solvents.

When the above experiment was repeated employing a cure time of 8.5 hours at 85–95° C., the product was a light yellow, infusible plastic material which was insoluble in common organic solvents.

*Example VII*

A sample of a tetrakis(β-carboglycidoxyethyl)tin product mixture prepared according to the procedure of Example III, part 1, and containing 48% of the theoretical epoxide value and 69% of the theoretical tin content was allowed to stand at room temperature in the persence of light for about 3 months. The resulting homopolymer polymeric tetrakis(β-carboglycidoxyethyl)tin, was yellow in color and elastomeric in character and was insoluble in common organic solvents.

I claim as my invention:
1. Per(β-carboglycidoxyethyl)mono- to di-tin.
2. Tetrakis(β-carboglycidoxyethyl)tin.
3. Hexakis(β-carboglycidoxyethyl)ditin.
4. The insoluble, infusible material obtained by heating per(β-carboglycidoxyethyl)mono- to di-tin with an epoxy curing agent.
5. The insoluble, infusible material obtained by heating per(β-carboglycidoxyethyl)mono- to di-tin with an epoxy curing agent containing active hydrogen atoms.
6. The insoluble, infusible material obtained by heating per(β-carboglycidoxyethyl)mono- to di-tin with a polycarboxylic acid anhydride.
7. The insoluble, infusible material obtained by heating tetrakis(β-carboglycidoxyethyl)tin with a polycarboxylic acid anhydride.

No references cited.

JOSEPH L. SCHOFER, *Primary Examiner.*

J. KIGHT III, *Assistant Examiner.*